US005610765A

United States Patent [19]
Colucci

[11] Patent Number: 5,610,765
[45] Date of Patent: Mar. 11, 1997

[54] OPTICAL PATH EXTENDER FOR COMPACT IMAGING DISPLAY SYSTEMS

[75] Inventor: D'Nardo Colucci, Durham, N.C.

[73] Assignee: The University of North Carolina at Chapel Hill, Chapel Hill, N.C.

[21] Appl. No.: 323,848

[22] Filed: Oct. 17, 1994

[51] Int. Cl.[6] .................................................. G02B 27/14
[52] U.S. Cl. ........................ 359/633; 359/495; 359/497
[58] Field of Search .................................. 359/493, 494, 359/495, 496, 497, 630, 633

[56] References Cited

U.S. PATENT DOCUMENTS

| | | | |
|---|---|---|---|
| 3,508,809 | 4/1970 | Wilder et al. | 350/403 |
| 4,583,855 | 4/1986 | Bareket | 356/351 |
| 4,808,978 | 2/1989 | Vernay | 359/493 |
| 4,859,031 | 8/1989 | Berman et al. | 350/174 |
| 5,003,300 | 3/1991 | Wells | 340/705 |
| 5,074,645 | 12/1991 | Gold et al. | 359/465 |
| 5,151,722 | 9/1992 | Massof et al. | 351/158 |
| 5,198,928 | 3/1993 | Chauvin | 359/465 |
| 5,321,416 | 6/1994 | Bassett et al. | 345/8 |

*Primary Examiner*—Georgia Y. Epps
*Assistant Examiner*—Thomas Robbins
*Attorney, Agent, or Firm*—Bell, Seltzer, Park & Gibson

[57] ABSTRACT

A compact image display system in which the optical pathway is folded and thereby extended between the image source and the imaging optics of the system. The image display system may be used in place of computer or television screens, and may further be affixed to a frame so that it is wearable by a human user as either a monocular or binocular device.

10 Claims, 2 Drawing Sheets

OPTICAL PATH EXTENDER FOR COMPACT IMAGING DISPLAY SYSTEMS

This invention was made with government support under Grant No: DABT63-93-C-0048 from the Advanced Research Projects Agency. The government has certain rights to this invention.

FIELD OF THE INVENTION

The present invention relates generally to the field of imaging display systems, and more particularly to a compact image display unit in which the optical pathway is folded and thereby extended between the image source and the imaging optics of the unit.

BACKGROUND OF THE INVENTION

Image display systems contained in helmets or goggle-like frames are known for use in virtual reality systems, where they provide a focused image to the wearer. Such head mounted image display systems typically require long optical paths (upwards of 1.5 inches) between the image source and the imaging optics. The long optical pathway required typically results in a bulky, non-user friendly helmet-like apparatus.

For a image display system worn directly in front of the eye, and assuming a flat image display panel having a display area of about 12 millimeter (mm)×16 mm, magnification and image location constrain the focal length of any single element "loupe-type" optical system (that is, a system using a simple eyepiece lens). The focal length of the loupe is constrained to approximately 32–33 mm and its distance to the image display panel approximately 30–31 mm. A lower bound on the size of the loupe is also set, at 10 mm×13 mm, but this must be increased somewhat to accommodate eye movement. Thus a simple loupe display placed approximately 25 mm from the eye (approximately the distance to the outside surface of an eyeglass lens), and providing an image equivalent to a 13 inch diagonal CRT screen viewed at a distance of about 20 inches, can be no smaller than about 12 mm×16 mm and 31 mm in length. These dimensions do not account for the thickness of the components themselves or any housing or packaging. The length and weight of such a system is typically awkward and may result in poor economics in use.

Options for shortening the display system include using a multi-element lens system or folding the optical path. The cost of multi-element lens systems is, however, prohibitive. U.S. Pat. No. 4,859,031 folds the optical path, but decreases light efficiency and is relatively expensive to manufacture. U.S. Pat. No. 5,151,722 provides an eyeglass-like display in which the image source is placed in the sidepieces of the frame and the optical path is folded.

SUMMARY OF THE INVENTION

It is an object of the present invention to provide a compact image display unit that incorporates an optical path extender. The image display unit includes an image source which emits polarized light and a polarizing beam splitter positioned in front of the image source, with the beam splitter positioned so that the image is first reflected by the front surface of the polarizing beam splitter. A first polarization rotation and reflecting device faces the front surface of the polarizing beam splitter and projects the image back through the polarizing beam splitter. A second polarization rotation and reflecting device faces the back surface of the polarizing beam splitter and projects the image onto the back surface of the polarizing beam splitter, so that the image is reflected by the back surface of the polarizing beam splitter. A focusing lens is positioned behind the polarizing beam splitter so that the image reflected by the back surface of the beam splitter is projected through the lens. The distance traveled by light in the interior of the image display unit is thus equal to the length of the image display unit interior plus twice the interior height.

It is a further object of the present invention to provide a compact image display unit which may be mounted on a frame wearable by a human subject, and configured so that when the frame is worn, the focusing lens of the image display unit is positioned in from of one of the subject's eyes. In a monocular image display system, the frame may be so configured to leave vision in the other eye essentially unobstructed. Alternatively, a plurality of image display units may be tiled together, with the focusing lens of each positioned in from of the eye of the subject, to provide a wider field of view. In a further embodiment of the present invention, the image display system is operatively associated with a head motion tracking system.

A further aspect of the present invention is an image display system wearable by a human subject, comprising a plurality of image display units carried on a mourning structure and a frame wearable by a human subject. The frame is connected to the image display units and is configured so that when it is worn by a human subject, the focusing lens of each of the image display units is positioned in from of at one eye of the wearer. By employing a plurality of image display units, the system may be configured as a binocular system, preferably wherein the focusing lens of each image display unit is positioned to be viewed by only one eye of the subject. Alternatively, the focusing lens of one or more image display units may be positioned to be viewed by both eyes of the subject. Where different image display units are viewed by different eyes, the system is a stereoscopic binocular system; where different image display units are viewed by the same eyes, the system is a panoramic binocular system. As with the monocular system, a multiplicity of image display units may be tiled together (e.g., in a three by two array or matrix of units). Again, in a further embodiment of the present invention, the image display systems are operatively associated with a head motion tracking system.

The foregoing and other objects and aspects of the present invention are explained in detail in the specification set forth below.

DETAILED DESCRIPTION OF THE PREFERRED EMBODIMENTS

The present invention provides a compact, lightweight image display unit which can be attached to an eyeglass-like frame or a helmet-like apparatus and positioned in front of a user's eye. An optical path extender is utilized to decrease the physical distance required between the image display component and the imaging optics. The optical path extender uses a polarizing beam splitter to fold the optical pathway of the image, decreasing the physical size of the device while providing a focused image to the user. The device of the present invention may be used in place of a computer or television display screen, as well as to provide images in virtual reality systems.

Figure 1:
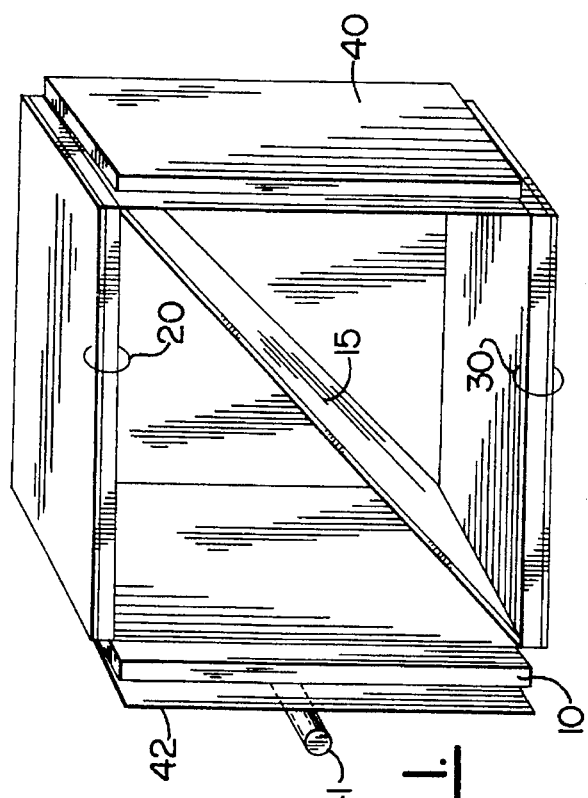
FIG. 1 is a three dimensional view of an embodiment of the present invention using a substantially planar polarizing beam splitter.

FIG. 1 is a three-dimensional view of an image display unit of the present invention having an optical path extender incorporated therein. The image display unit comprises an image source for emitting polarized light in the form of an image (10) and a polarizing beam splitter (15) positioned at an angle in front of the image source. The polarizing beam splitter is positioned so that the image provided by the image source (10) is reflected upwards by the front surface of the polarizing beam splitter. A first polarization-rotation and reflecting device (20) faces the polarizing beam splitter front surface portion so that the image is projected back through the polarizing beam splitter. A second polarization-rotation and reflecting device (30) faces the polarizing beam splitter back surface portion and projects the image onto the back surface portion of the polarizing beam splitter so that the image is reflected by the polarizing beam splitter. A focusing lens (40) is positioned behind the polarizing beam splitter so that the image reflected by the back surface of the beam splitter is projected through the lens.

Figure 2:
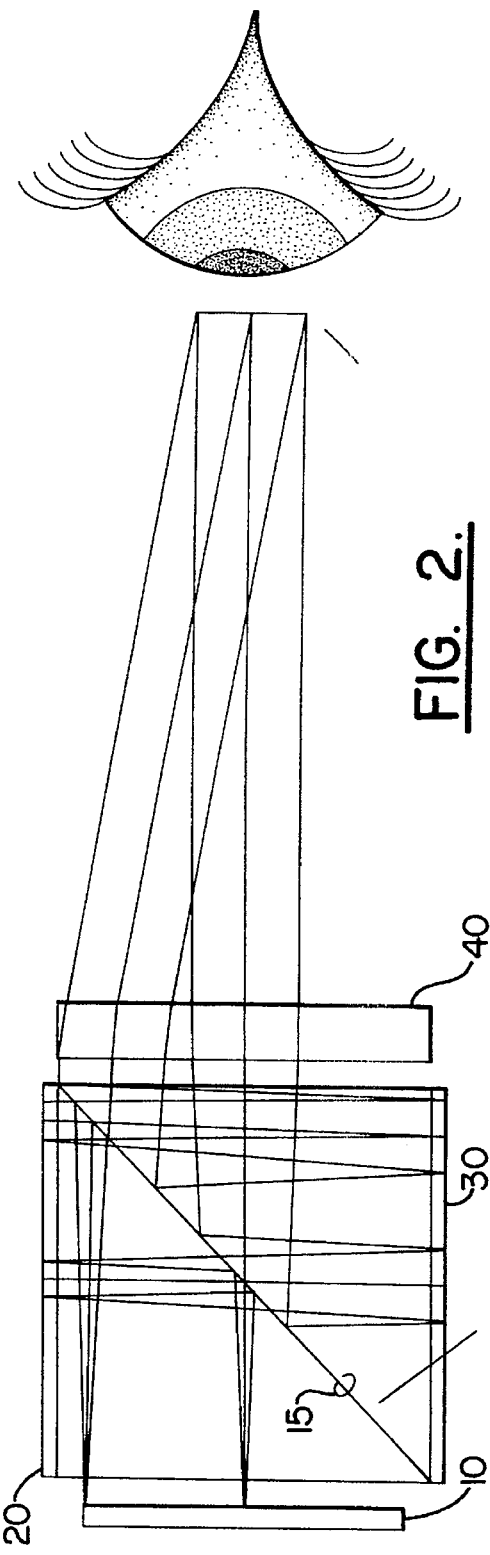
FIG. 2 is a schematic drawing showing the path of light in an image display unit of the present invention. The light path is equal to the length of the image display unit plus twice its interior height.

FIG. 2 schematically illustrates a ray trace of the image display unit of the present invention. As used herein, light refers to electromagnetic radiation in the visible spectrum. Polarized light emitted by the image source (10) is incident upon the back surface of the polarizing beam splitter (15), and is reflected upwards. The light is then incident upon the first polarization-rotation and reflecting device (20), which reflects the light so that it is projected through the polarizing beam splitter (15). The light is then incident upon the second polarization-rotation and reflecting device (30), which reflects the light so that it is projected onto, and reflected by, the polarizing beam splitter (15), and then passes through the focusing lens (40) to provide an image to a viewer's eye. The total path length traveled by light within the image display unit is thus the length of the image display unit plus twice its interior height. It will be apparent to those skilled in the art that the polarizing beam splitter may be oriented so that light is either first reflected downwards toward a reflection device, or first reflected upwards toward a reflection device.

The polarizing beam splitter (15) may comprise a planar surface made of a substance that is substantially optically neutral, for example, a glass plate, and having a dielectric coating on one or both surfaces. This plate is placed at an angle between the first and second wave retarder plates, as is shown in FIG. 1. Suitable dielectric coatings are known in the art. Alternatively, the polarizing beam splitter (15) may comprise two triangular optical prisms positioned with their diagonal faces in opposition to provide an essentially rectangular prism, with a dielectric coating sandwiched between the two diagonal faces. Alternatively, a single triangular optic prism, with a dielectric coating on the diagonal face, may provide the polarizing beam splitter. Prisms may be made of glass or plastic, as is known in the art. The polarizing beam splitter may be a linear polarizing beam splitter or a circular polarizing beam splitter, as are known in the art. It will be apparent to those skilled in the art that when a linear polarizing beam splitter is used, the image presented to the polarizing beam splitter must be in the form of linearly polarized light. Similarly, when a circular polarizing beam splitter is employed, the image presented to the polarizing beam splitter must be in the form of circularly polarized light. Optical filters known in the art are available to linearly or circularly polarize light, and may be used in the present invention to present the required form of light to the polarizing beam splitter.

The image source (10) may be any suitable image display source as is known in the art. Liquid crystal displays (LCDs) are preferred for use with linear polarized beam splitters as they emit linearly polarized light. Other suitable image sources include Cathode Ray Tubes (CRT), Field Emitting Devices (FED) and Electroluminescent devices (EL). Optical filters to diffuse or alter the color or quality of light emitted by the image source may optionally be interposed between the image source and the polarizing beam splitter. It will be apparent to those skilled in the art that, when using a image source that emits non-polarized light, a polarizing filter must be interposed between the image source and the polarizing beam splitter. An illuminating light source must be provided when an LCD image source is used, in order to illuminate the image displayed thereon. The illuminating light source may be a light bulb, as shown in FIG. 1. Alternatively, the back of the LCD panel may be exposed to ambient light in order to illuminate the LCD panel. When a cathode ray tube is used as the image source, no illuminating light source is required. The need for, and appropriate choice of, an illuminating light source in combination with a particular image source will be readily apparent to those skilled in the art.

Dielectric coatings suitable for use in the present invention are known in the art. The coating may be a single layer of a dielectric material, or multiple layers of dielectric materials having varying indices of refraction.

The first and second polarization-rotation and reflecting devices may each be constructed of a wave retarder plate and a mirrored surface. A quarter wave retarder plate with a mirrored backing may be employed to rotate linearly polarized light by 90°. For example, linearly polarized light which projects through a linear polarizing beam splitter, upon passing through a quarter wave retarder plate, being reflected by a mirrored surface and returning through the quarter wave retarder plate, will be rotated 90° (relative to the light prior to entering the wave retarder plate) and will then be reflected by the polarizing beam splitter.

As shown in FIG. 1, an optional illuminating light source (41) may be placed behind the image source (10) to increase the brightness of the image provided thereby. An optional optical filter (42) may be interposed between the image source and the light source. The Optical filter may be selected to diffuse, change the color, or otherwise alter the light emitted by the illuminating light source. Appropriate selection of an optical filter will depend on the illuminating light source, the image source, and the desired effect, and will be apparent to one skilled in the art. As used herein, an optical filter means a filter which transmits light but alters the quality of the light; a wide variety of optical filters are known in the art and may serve, for example, to diffuse the light, alter the polarity of the light, or change the color of the light.

The focusing lens (40) is preferably a Fresnel lens, which absorbs less light than a comparable standard lens and weighs less than a standard lens providing comparable optical effects.

It will be apparent to one skilled in the art that the present invention may be adapted for use with circularly polarized light. Such an embodiment utilizes a circularly polarizing beam splitter and requires that the light emitted by the image source also be circularly polarized. This may be accomplished, for example, by using a quarter wave retarder plate (λ4 wave plate) to circularly polarize the image source output where needed.

In use an image display unit of the present invention is operably connected to drive electronics for driving the display and providing a source of video display information, and to a power source. The drive electronics and power supply are preferably housed separately and remotely from the image display unit and are connected to the image display unit via a conventional electric cable as is known in the art.

The image display unit of the present invention may be mounted on a helmet or frame, such as an eyeglass or goggle-like assembly, to provide an image display system which can be worn by a subject to position the image display unit in front of the subject's eye. Such mounted display systems may include a sensor coupled to the wearer for sensing the position and orientation of the wearer, and a visual image generator operably connected to the sensor and the image source, to generate an image which appears responsive to the wearer's movements.

A preferred embodiment of the present invention is a head mounted image display system, further comprising a visual image generator and a head tracking system, wherein the head tracking system is operably connected to the head of the subject wearing the image display system, and the visual image generator and head tracking system are operably connected to provide images which alter in response to the subject's movements, to cause the image to appear to move in concert with the subject's movements. Head tracking systems are known in the art, for example, the FASTRAK™ system available from Polehmus, Colchester, Vt. Other commercially available head tracking systems and sensors are known in the art.

Wearable image display systems of the present invention may be monocular or binocular. Monocular systems may be designed to position a single image display unit for use by only one of a wearer's eyes, while leaving vision in the other eye essentially unobstructed. Such systems are useful when the subject does not wish to be isolated from the environment. Alternatively, multiple image display units may be joined in a monocular image display system, so that the focusing lenses of the image display units are directed toward one eye of the wearer. Vision in the other eye of the wearer may be left unobstructed. Similarly, binocular systems may be designed to position a single image display unit in front of each of the wearer's eyes, and may provide different images to each eye to provide a stereoscopic effect. Alternatively, multiple image display units may be joined together in a binocular system. Preferably a binocular system is a stereoscopic binocular system, where a plurality of the image display units are directed toward one eye of the wearer, and a plurality of image display units are directed toward the other eye of the wearer (e.g., the focusing lens of each image display unit is positioned so that it is viewed by a single eye). A panoramic binocular image display system may also be constructed, using multiple image display units, positioning the focusing lenses of a plurality of image display units in front of both eyes of the subject.

Thus, multiple image display units of the present invention may be connected together in a matrix to create a continuous wide field of view, such as for example about 120°. A different image may be provided to each image display unit to provide a panoramic effect. In designing systems using multiply connected image display units of the present invention, it is preferred that each of the subject's eyes view a matrix which is three image display units wide (relative to side-to-side motion of the eye) and two image display units high.

Figure 3:
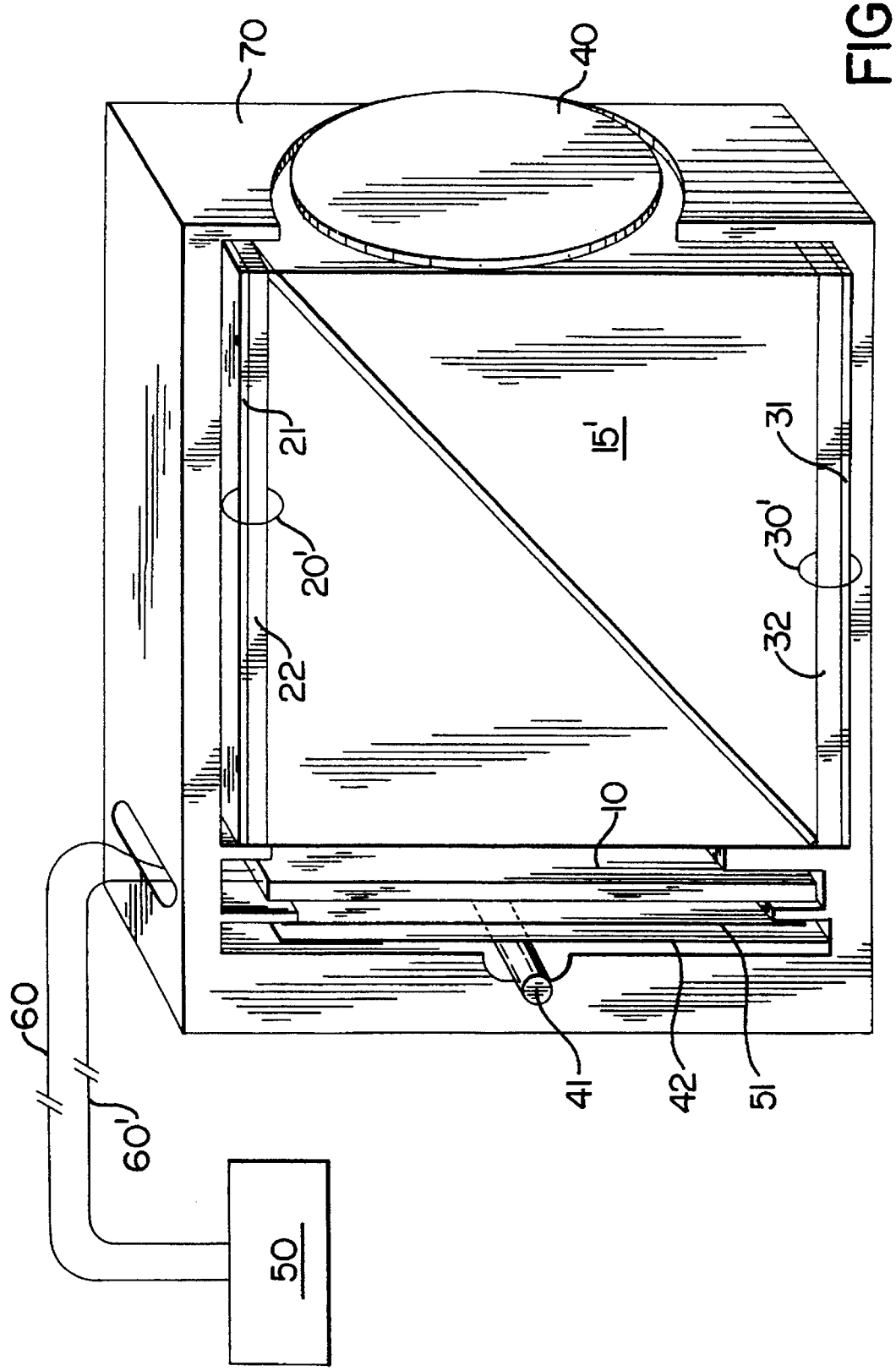
FIG. 3 shows a three dimensional view of an image display unit of the present invention placed inside a housing and connected to drive electronics.

As shown in FIG. 3, an image display unit according to the present invention is constructed using a Broadband Polarizing Cube Beamsplitter (20 mm cube; 450–680 mm visible wavelength band) (Part No. 03PBB003, Melles-Griot, Irvine, Calif.) as the polarizing beam splitter (15'). This polarizing beam splitter comprises two triangular optical prisms positioned with their diagonal faces in opposition to form a substantially cuboid prism, with a dielectric coating sandwiched between the two opposing diagonal faces. The dielectric coating defines a front surface portion and a back surface portion of the polarizing beam splitter. Each of the two polarization-rotation and reflecting devices (20' and 30') is made of a quarter wave retarder plate (22 and 32) (Part No. 02 WRM 003, Melles-Griot, Irvine, Calif.); the back of each quarter wave retarder plate is coated with silver by vacuum evaporation technique in accordance with known techniques to provide a mirror (21 and 31). One polarization-rotation and reflecting device (20) is placed above the polarizing beam splitter and one (30) is placed below the polarizing beam splitter. The image source is a color LCD (240×120 pixel) (Virtual I/O, 1002 Second Avenue, Suite 3710, Seattle, Wash. 98104) (10), and is connected to associated drive electronics (50) (Virtual I/O, Seattle, Wash.). The LCD is back lit by a small fluorescent bulb (41) (3 mm diameter, 1 inch long) (Virtual I/O, Seattle, Wash.). A diffusing filter (42) (Rosco Cinegel 3000 Tough Rolux dense diffusor) is placed between the fluorescent bulb and the LCD display. To reduce the green output from the fluorescent light source, a second filter (51) is used in conjunction with the diffusor (Rosco Cinegel 3314 Touch ¼ Minusgreen). A 56 mm focal-length lens (Edmund Scientific Co., Barrington, N.J.; Part No. J32,631) is used as the focusing lens (40). A case to hold the above-described components is machined out of acrylic (70) (shown in FIG. 3 in cut-away view). The LCD image source (10) and the illuminating light bulb (41) are operably connected to drive electronics (50) via standard electric cables (60 and 60').

The image display unit constructed as described above is attached to a clamp taken from a pair of standard clip-on sunglasses (not shown), which allow the image display unit to be easily attached to a wearer's existing eyeglasses, or to an eyeglass frame (without eyeglass lenses therein). In this construct, a single image display unit is positioned in front of one of the wearer's eyes and vision in the other eye is essentially unobstructed.

In use, the image from the LCD in the form of linearly polarized light passes through the two optical filters and then undergoes total internal reflection at the front surface portion of the polarizing beam splitter, due to Brewster angle reflection from the dielectric coating. Light then travels upward where it is incident upon the first wave retarder plate and the first mirror. Upon passing through the quarter wave retarder plate, reflection by the mirror, and returning through the quarter wave retarder plate, the polarization angle of the light is rotated 90° so that it then passes undeflected through the polarizing beam splitter to strike the second wave retarder plate and mirror. Light is again rotated 90° so that then experiences a total internal reflection by the polarizing beam splitter, and is projected through the focusing lens.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A monocular image display system wearable by a human subject, comprising:
   a) at least one image display unit carried by a mounting structure, said image display unit comprising:
      i) an image source for emitting polarized light in the form of an image;
      ii) a polarizing beam splitter positioned in front of said image source and at an angle thereto, with said polarizing beam splitter having a front surface portion and a back surface portion, and with said beam splitter positioned so that said image is reflected by said front surface portion;
      iii) first polarization-rotation and reflecting means facing said polarizing beam splitter front surface portion for projecting said image back through said polarizing beam splitter;
      iv) second polarization-rotation and reflecting means facing said polarizing beam splitter back surface portion for projecting said image onto said polarizing beam splitter back surface portion so that said image is reflected thereby;
      v) a focusing lens positioned behind said polarizing beam splitter, and with said focusing lens positioned so that said image reflected by said beam splitter back surface portion is projected therethrough; and
   b) a frame wearable by a human subject, said frame connected to said image display unit with said frame configured so that, when attached to a human subject, said focusing lens of said image display unit is positioned in front of an eye of said human subject.

2. The monocular image display system of claim 1, wherein said frame is configured so that when worn by a human subject, vision from the other eye of said subject is substantially unobstructed.

3. The monocular image display system of claim 1, wherein said frame is a head-mountable frame.

4. The monocular image display system of claim 1, further comprising a head motion tracking system operatively associated with said image display system.

5. The monocular image display system of claim 1, comprising a plurality of said image display units connected to said frame, with each of said image display units positioned on said frame so that when said frame is attached to a human subject, said focusing lens of each of said image display units is positioned in front of the same eye of said subject.

6. An image display system wearable by a human subject, comprising:
   a) a plurality of image display units, each of said image display units carried by a mounting structure, each of said image display units comprising:
      i) an image source for emitting polarized light in the form of an image;
      ii) a polarizing beam splitter positioned in front of said image source and at an angle thereto, with said polarizing beam splitter having a front surface portion and a back surface portion, and with said beam splitter positioned so that said image is reflected by said front surface portion;
      iii) first polarization-rotation and reflecting means facing said polarizing beam splitter front surface portion for projecting said image back through said polarizing beam splitter;
      iv) second polarization-rotation and reflecting means facing said polarizing beam splitter back surface portion for projecting said image onto said polarizing beam splitter back surface portion so that said image is reflected thereby;
      v) a focusing lens positioned behind said polarizing beam splitter, and with said focusing lens positioned so that said image reflected by said beam splitter back surface portion is projected therethrough;
   b) a frame wearable by a human subject, said frame connected to said image display units, with said frame configured so that when said frame is attached to a human subject, said focusing lens of each of said image display units is positioned in front of at least one eye of said subject.

7. An image display system according to claim 6, wherein said system is a binocular system, wherein said focusing lens of at least one of said image display units is positioned in front of one eye of said subject, and wherein said focusing lens of at least one other of said image display units is positioned in front of the other eye of said subject.

8. An image display system according to claim 6, wherein said system is a binocular system, and wherein said focusing lens of at least two of said image display units is positioned in front of both eyes of said subject.

9. The image display system of claim 6, wherein said frame is a head-mountable frame.

10. The binocular image display system of claim 9, further comprising a head motion tracking system operatively associated with said image display units.

* * * * *